United States Patent [19]

Hintz

[11] Patent Number: 4,792,148
[45] Date of Patent: Dec. 20, 1988

[54] SEMI-TRAILER TRUCK

[76] Inventor: John C. Hintz, P.O. Box 1021, Eau Claire, Wis. 54702

[21] Appl. No.: 84,395

[22] Filed: Aug. 11, 1987

[51] Int. Cl.$^4$ .............................................. B62D 13/06
[52] U.S. Cl. ............................... 280/81 A; 280/405 A; 280/704
[58] Field of Search ............... 280/81 A, 86, 661, 704, 280/405; 180/209, 24.02

[56] References Cited

U.S. PATENT DOCUMENTS

| | | | |
|---|---|---|---|
| 2,847,228 | 8/1958 | Hall | 280/81 |
| 3,195,922 | 7/1965 | Humes | 280/81 A |
| 3,880,440 | 4/1975 | Tidewall | 280/81 A |
| 4,284,156 | 8/1981 | Carstensen et al. | 180/24.02 |
| 4,373,738 | 2/1983 | Lange | 280/704 |
| 4,614,247 | 9/1986 | Sullivan | 180/24.02 |

Primary Examiner—David M. Mitchell
Assistant Examiner—Donn McGiehan

[57] ABSTRACT

A semi-trailer includes a self-steering rear axle assembly and a stationary axle assembly located at least 10 feet in front of the self-steering axle assembly and at least the minimum distance from the tractor front axle. The wheels on the self-steering axle assembly are carried on king pin assemblies which are movable between forward and reverse positions so that the self-steering axle wheels track the stationary axle wheels during turning in both the forward and reverse directions. The self-steering axle assembly preferably is retractable so the wheels can be raised when not needed. In one embodiment, the tractor has only a front axle and a single drive axle and all axles have a load rating of at least one-fourth of the load rating of the semi-trailer truck unit so that a maximum gross load can be hauled even though the unit has only four axles.

12 Claims, 3 Drawing Sheets

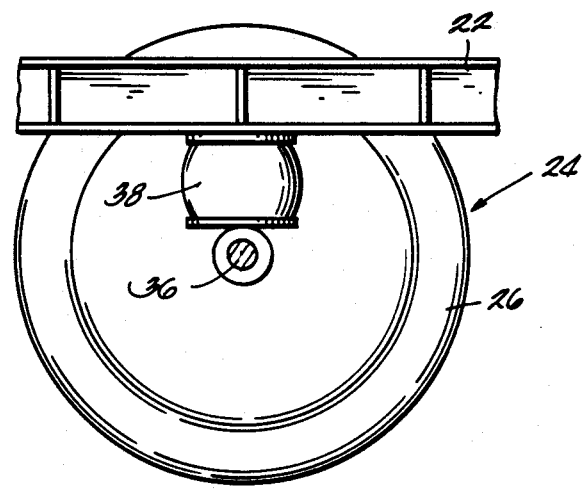
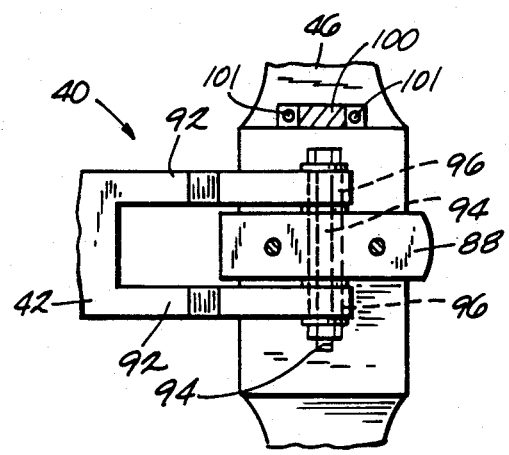

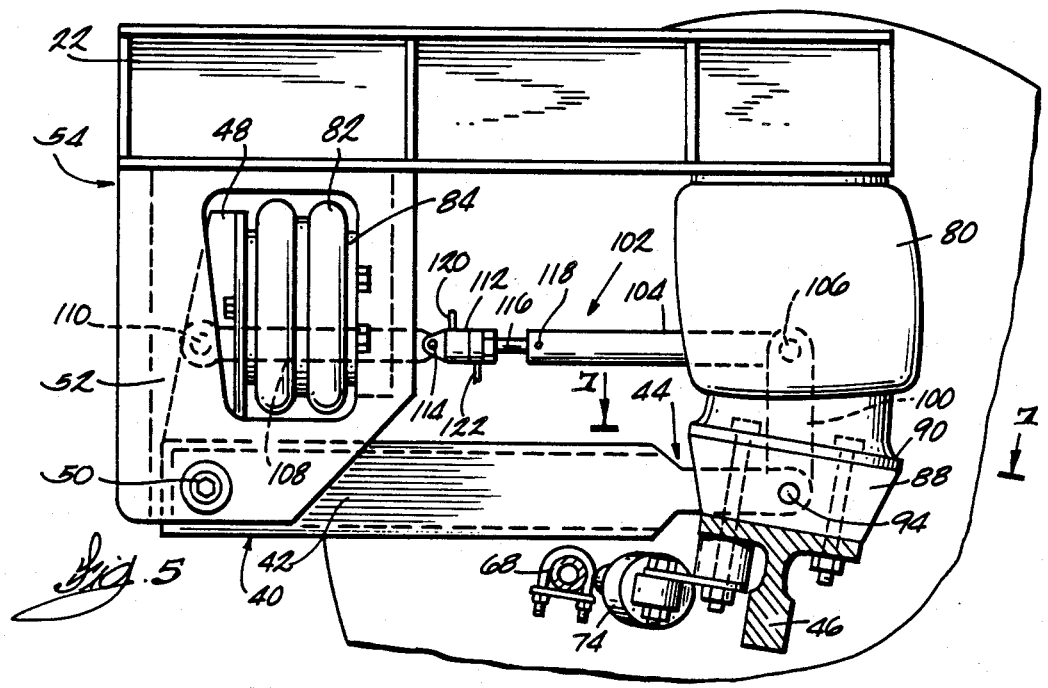
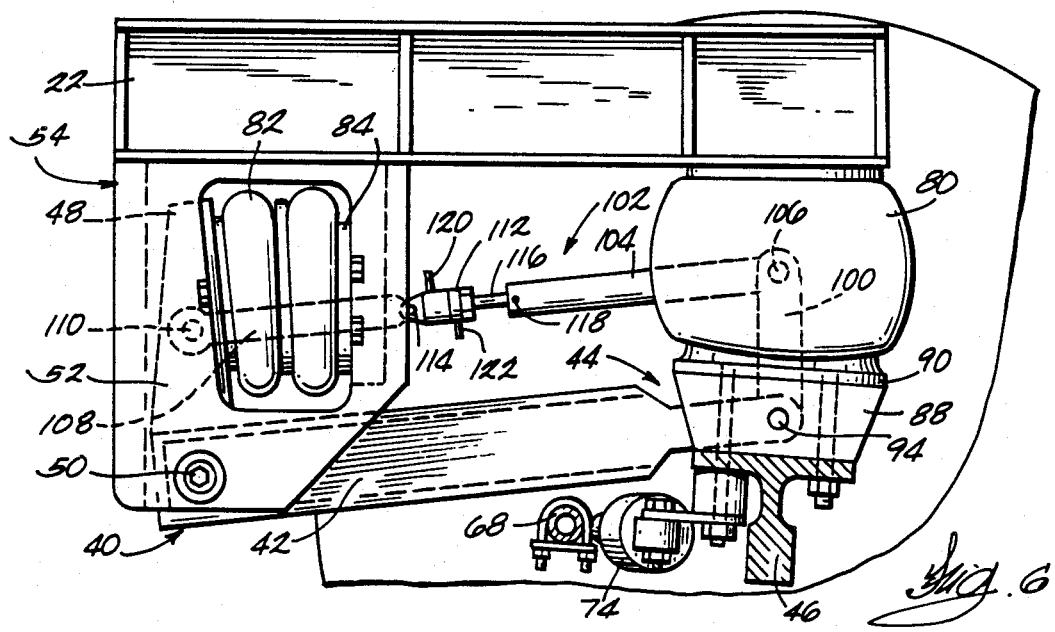
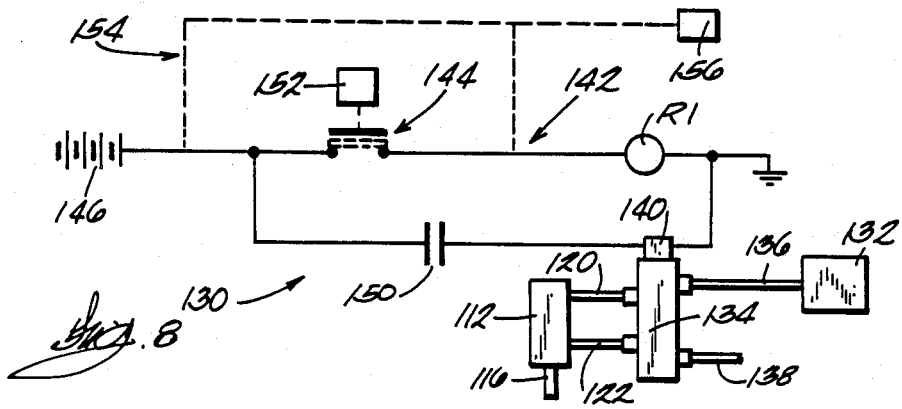

SEMI-TRAILER TRUCK

BACKGROUND OF THE INVENTION

This invention relates to semi-trailer trucks and, more particularly, to over-the-road semi-trailer trucks for hauling heavier loads.

To ensure proper load distribution for safety reasons and to minimize road damage, government regulations establish maximum weight per axle for over-the-road semi-trailer trucks and require minimum spacing between certain axles. For example, present federal regulations require that single axles bearing up to a maximum of 20,000 pounds must be at least ten feet apart. For semi-trailer trucks rated for a maximum gross load of 80,000 pounds, both the tractor and semi-trailer usually have tandem axles spaced about four feet apart. The maximum gross weight imposed on the front steering axle of the trailer is 13,000 and 20,000 for any other axle. The normal weight distribution for a gross load of 80,000 pounds is 12,000 pounds on the tractor front axle, 34,000 pounds on the tractor tandem axles and 34,000 pounds on the semi-trailer tandem axles.

The wheels on the semi-trailer tandem axles are not steerable and the turning axis of the semi-trailer is at the midpoint of one axle or at a location between the axles. Consequently, when a corner or curve is being negotiated, the wheels on the or both axles are dragged sideways, causing the tires to be scuffed. This also imposes a torque on the semi-trailer support frame members which require these members to be beefed up and can cause premature fatigue. If the semi-trailer axles are spaced at least ten feet apart so that each individual axle can bear a maximum of 20,000 pounds, this problem is compounded.

Because of the relatively long distance between the tractor fifth wheel and the turning axis of the semi-trailer, the tractor must be swung wide when turning corners on the city streets and the like. This turning radius for longer semi-trailers can be great enough in some cases to make it impossible to drive the truck in closely confined areas.

When a semi-trailer truck is being dead-headed or hauling a light load, the load distribution may be such that government regulations could be met with a semi-trailer having a single load bearing axle in contact with the road. Thus, the tires on the extra axle and are not needed and worn unnecessarily. Also, the rolling friction from the unneeded axle reduces gas mileage.

Because of the relatively long span between the tractor fifth wheel and the semi-trailer rear axle, the semi-trailer support frame members must be quite heavy in order to provide the structural integrity required to support the load over that span. Substantially lower strength, and therefore, lighter frame members could be used if one of the two rear axles could be moved forward to reduce the bridge or span between the load bearing axles and the torque problem mentioned above could be minimized. Such a weight reduction also would reduce gas mileage and decrease tire wear.

Elimination of one of the tractor axles also is desirable. It can reduce the cost of manufacture and the cost of operation because of a reduction in gross weight and rolling tire friction, fewer tires and the elimination of tire scuffing caused by tandem axles. Also, a smaller horsepower engine could be used and still deliver the same horsepower to the ground.

SUMMARY OF THE INVENTION

An object of the invention is to provide a semi-trailer having a rear axle system which is arranged to minimize tire wear.

Another object of the invention is to provide a semi-trailer having a reduced turning radius.

Another object of the invention is to provide a semi-trailer having a self-steering rear axle assembly which is arranged so that the wheels track the wheels on the preceding axle during both forward travel and backing.

Another object of the invention is to provide a semi-trailer described in the immediately preceding paragraph in which the self-steerable rear axle can be raised to a retracted position when the semi-trailer is unloaded or carrying a light load.

Another object of the invention is to provide a four axle tractor/semi-trailer combination capable of hauling a maximum gross load of 80,000 pounds over the road.

Other objects, aspects and advantages of the invention become apparent to those skilled in the art upon reviewing the following detailed description, the drawing and the appended claims.

A semi-trailer provided by the invention includes a frame supported for over-the-road travel by a first or stationary axle assembly and a second or self-steering axle assembly. The self-steering axle is spaced rearwardly from the front axle of the truck-tractor at least the minimum distance required by government regulations and the stationary axle is spaced at least 10 feet in front of the self-steering axle. The wheels on the self-steering axle assembly are interconnected so they steer together and means are provided for causing the wheels to track the wheels of the stationary axle assembly when the semi-trailer is turned in both the forward and reverse directions.

In one embodiment, the wheels of the self-steering axle assembly are carried by king pins which are mounted for pivotal movement between a forward position where the longitudinal axes of the king pin assemblies are upwardly inclined in a rearward direction at a forward angle and a reverse position where the longitudinal axle are upwardly inclined in a forward direction at a reverse angle. The forward and reverse angles are less than about thirty degrees to a vertical plane passing through the rotational axis of the wheels. The king pins are selectively moved between the forward and the reverse positions so that the wheels track movement of the semi-trailer in both directions.

In one embodiment, load adjusting means are provided for adjusting the load borne by the stationary and self-steering axle assemblies and for maintaining a balance therebetween so that the load borne by the self-steering axle assembly does not exceed the load borne by the stationary axle assembly. This load adjusting means can include a first pair of air inflatable air springs disposed between the semi-trailer frame and the stationary axle, a second pair of inflatable air springs disposed between the semi-trailer frame and the self-steering axle and means for pressurizing the springs including a control for preventing the pressure delivered to the air springs for the self-steering axle from exceeding the pressure delivered to the air springs for the stationary axle.

The invention also provides a semi-trailer truck unit including a tractor having a front axle and a single drive axle and a semi-trailer having first or stationary axle assembly and a second or self-steering axle assembly described above. The unit has a maximum gross load rating, e.g., 80,000 lbs., and the tractor front axle, the tractor drive axle, the semi-trailer stationary axle and the semi-trailer self-steering axle all have a gross load rating of at least one-fourth of the unit rating, e.g., 20,000 lbs.

BRIEF DESCRIPTION OF THE DRAWING

FIG. 5 is a further enlarged fragmentary side elevational view of the self-steering axle assembly similar to FIG. 3 with some parts removed for clarity.

FIG. 6 is a view similar to FIG. 5 showing the self-steering axle assembly in the retracted position.

FIG. 7 is a fragmentary, sectional view taken generally along line 7—7 in FIG. 6.

FIG. 8 is a schematic illustration of a control system for selectively moving the king pin assemblies of the self-steering axle assembly between forward and rear positions.

FIG. 9 is a schematic representation of a control system for maintaining a balance between the loads borne by the stationary and self-steering axle assemblies.

DESCRIPTION OF THE PREFERRED EMBODIMENTS

Figure 1:
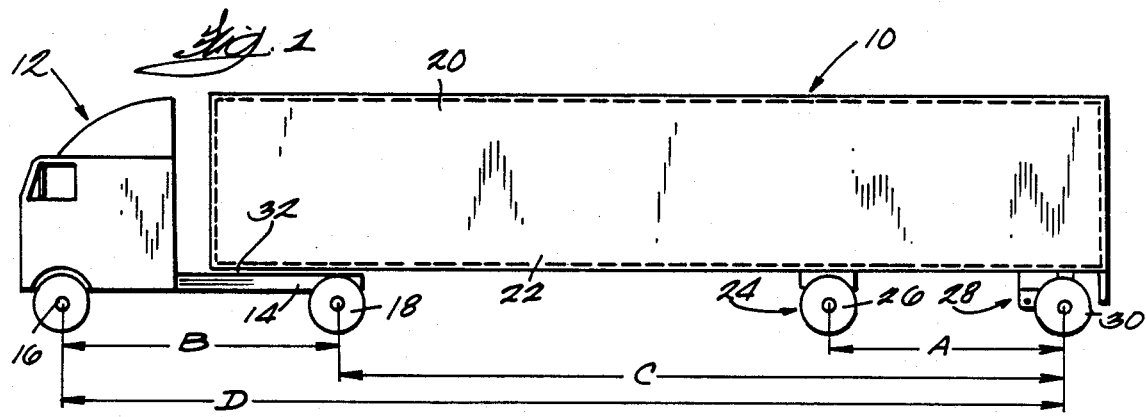
FIG. 1 is a side elevational view of a semi-trailer truck including a tractor having a single drive axle and a semi-trailer having a stationary axle assembly and a raisable, self-steering axle assembly shown with the self-steering axle assembly in the operating position.

Illustrated in FIG. 1 is a semi-trailer truck 10 including a cab or tractor 12 having a chassis 14 supported for travel over the ground by front steering wheels 16 and rear drive wheels 18 driven by a drive shaft (not shown) in the usual manner. The semi-trailer truck 10 also includes a semi-trailer 20 which has a pair of frame members 22 supported for travel by a conventional stationary axle assembly 24 including wheels 26 and a self-steering axle assembly 28 including wheels 30 and rearwardly spaced from the stationary axle assembly 24. Both the stationary and the self-steering axle assemblies preferably have a gross load rating of at least 20,000 pounds. The semi-trailer 20 is connected to the tractor by a conventional swivel mount or so-called fifth wheel 32 which provides a generally vertical swivel axis about which the tractor 12 and the semi-trailer 20 pivots relative to each other during turning.

Figure 2:
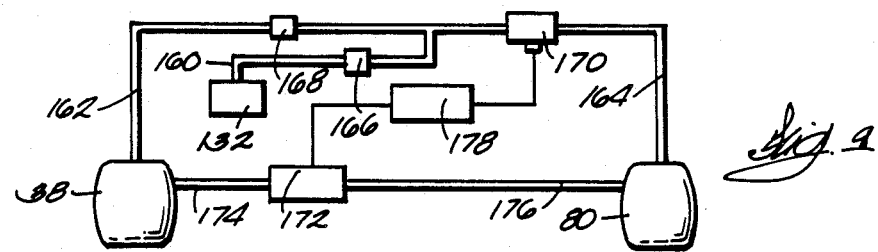
FIG. 2 is an enlarged, fragmentary side elevational view, partially diagrammatic, of the stationary axle assembly.

Referring to FIG. 2, the stationary axle assembly 24 includes a transversely extending axle member 36 which is supported from the semi-trailer frame members 22 by a pair of conventional air bags or springs 38 (one shown). The air springs 38 are airtight, bellows-like rubber units and the interiors are connected to a source of compressed air through a suitable air supply which pressurizes the air springs 38. A wheel or a pair of wheels 26 (one shown) is rotatably mounted on each of the opposite end portions of the axle member 36.

While the self-steering axle assembly 28 can be fixably supported on the semi-trailer frame members 22, in the specific construction illustrated, it is arranged for pivotal movement between an operating position and a retracted position.

The self steering axle assembly 28 includes a pair of laterally spaced, rearwardly extending, generally L-shaped arms 40 (one shown in FIGS. 3, 5 and 6), each including a first or horizontal leg 42 having an outer or rear end 44 which supports a transversely extending axle member 46 as described in more detail below and a second or vertical leg 48. Each of the arms 40 is pivotally mounted via a bolt or pin 50 on laterally-spaced, longitudinally-extending side members 52 of a support bracket 54 which extends downwardly from and is affixed to a respective semi-trailer frame member 22. The arms 40 pivot relative to the bracket 54 about a first transverse axis defined by the pins 50.

When the axle member 46 is in the lowered or operating position, the distance between its center and the center of the stationary axle member 36, i.e., the distance A in FIG. 1 between the rotational axes of the self-steering axle wheels 30 and the stationary axle wheels 26, is at least 10 feet. This is the minimum distance between 20,000 pound axle under present federal government regulations. While the self-steering axle member 46 can be substantially straight, it preferably is generally U-shaped and includes a central portion 56 which extends laterally between the trailer frame members 22 and opposite end portions 58 which are upwardly offset from the central portion 56. Mounted on each outer end portion 58 is a king pin assembly 60 supporting a wheel 30 for rotation about a transverse axis 62.

The king pin assemblies 60 are arranged to permit steering movement of the wheels 30. That is, each kingpin assembly 60 has a longitudinal pivot axis 64 and the respective wheel 30 is free to pivot about that axis relative to the axle member 46. Each king pin assembly 60 includes a steering arm or link 66. The steering links 66 are interconnected by a tie rod 68 so that the wheels 30 turn together, i.e., are self-steering. When corners or curves are being negotiated, the stationary axle wheels 26 act as a pivot for the semi-trailer 20 and the self-steering axle wheels 30 generally follow the stationary axle wheels 26, thereby minimizing scuffing of the self-steering axle tires 70 and the torque applied on the semi-trailer frame members 22. The tie rod 68 preferably is located in front of the kingpin assemblies 60 as illustrated and the pivotal connections to the steering links 66 are located relative to the turning axis of the semi-trailer 20, i.e., midpoint of the stationary axle member 36, in accordance with the Ackerman theory.

For the self-steering axle wheels 30 to best track the stationary axle wheels 26, the king pin assemblies 60 are positioned at a positive caster. That is, they are positioned so that the longitudinal axes 64 are upwardly inclined in a rearward direction at an acute angle to a vertical plane (represented by line 72 in FIG. 3) passing through the rotational axes 62 of the wheels.

Damping means preferably are provided for minimizing flutter or shimmy of the self-steering axle wheels 30. Suitable damping means are disclosed in Lange U.S. Pat. No. 4,373,73 which is incorporated herein by reference. In the specific construction illustrated, a hydraulic cylinder 74 including internal orifices is connected at one end to the axle member 46 at 76 and at the opposite end to the tie rod 68 at 78. The hydraulic cylinder 74 also serves to return the wheels 30 to a centered or straight-ahead position in the event the self-steering axle assembly 28 is moved from the operating position to the retracted position with the wheels turned.

The axle member 46 is supported from the semi-trailer frame members 22 by a pair of conventional air bags or springs 80, each mounted between a semi-trailer frame member 22 on the axle member 46. The air springs 80 can be the same construction as the air springs 38 on the stationary axle member 24 and connected to the same source of compressed air. When pressurized, the air springs 80 urge the axle member 46 downwardly to bring the wheels 30 into engagement with the ground.

Figure 3:
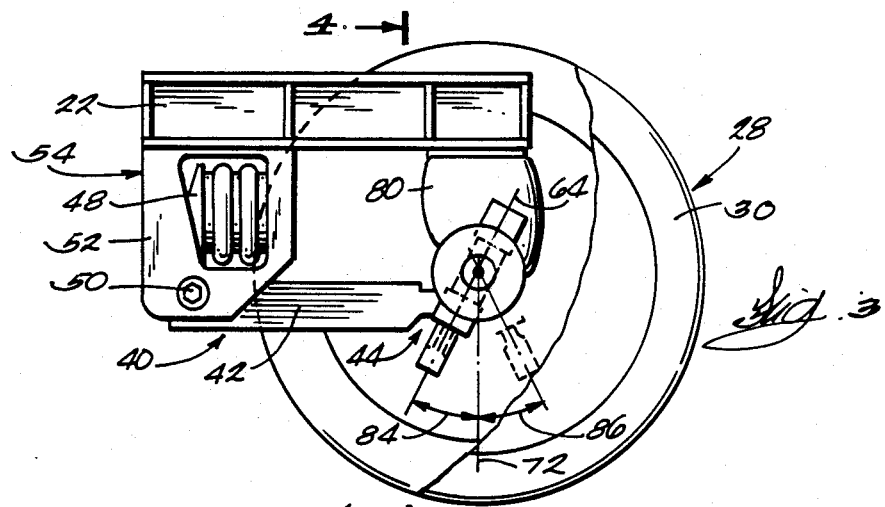
FIG. 3 is an enlarged, fragmentary side elevational view of the self-steering axle assembly shown in the operating position.
Figure 4:
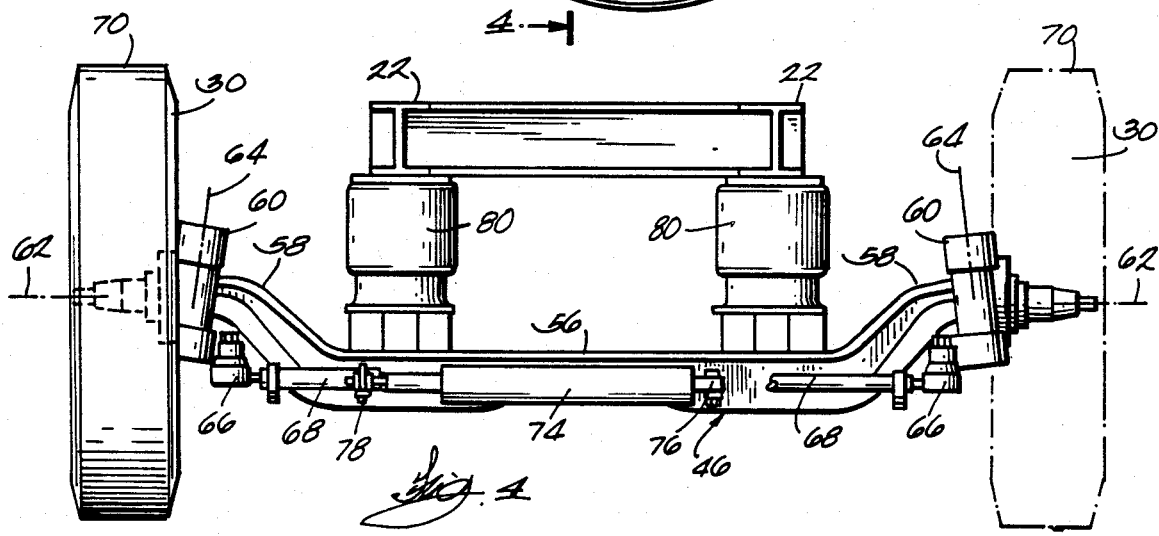
FIG. 4 is a fragmentary, sectional view taken generally along line 4—4 in FIG. 3.

Means are provided for moving the axle member 46 between an operating position shown in FIGS. 3, 4 and 5 wherein the tires 70 are in engagement with the ground and the retracted position shown in FIG. 6 wherein the wheels 30 are raised above the ground. While various means can be used for this purpose, in the specific construction illustrated, such means includes air bags or springs 82, similar to but smaller than the air springs 38 and 80, mounted between the vertical leg 48 of each arm 40 and a laterally extending end member 84 on the support bracket 54. The interior of the smaller air springs 82 can be connected to the same source of compressed air as the air springs 38 and 80.

To raise the axle member 46 and the wheels 30 to the retracted position, the larger air springs 80 are de-pressurized and the smaller air springs 82 are pressurized. The expansion of the smaller air springs 82 causes the arms 42 to rotate in a counterclockwise direction as viewed in FIGS. 3, 5 and 6 about the pivot axis defined by the pin 50, thereby moving the axle member 46 and the wheels 30 to a retracted position. The axle member 46 and the wheels 30 are moved to the operating position by de-pressurizing the smaller air springs 82 and pressurizing the larger air springs 80.

When the axle member 46 is U-shaped as illustrated, it can be raised to a location where the central portion 56 is against or immediately adjacent the bottom edges of the semi-trailer frame members 22 and the outer portions 58 are located above the bottom edges of the semi-trailer frame members 22. Thus, the rotational axes 62 of the wheels 30 are located above the bottom edges of the semi-trailer frame members 22, thereby maximizing the above-ground clearance of the wheels 30. The axle number 46 can be substantially straight if desired.

To facilitate proper tracking of the self-steering axle wheels 30 during both forward movement and backing, means are provided to afford pivotal movement of the king pin assemblies 60 relative to the semi-trailer frame members 22 between a forward travel position or positive caster illustrated by the solid lines in FIG. 3 and a reverse travel position or negative caster illustrated by the dashed lines in FIG. 3. When the king pin assemblies 60 are in the forward position, the longitudinal axes 64 are upwardly inclined in a rearward direction at a forward angle represented by reference numeral 84 with the bottoms of the king pin assemblies 60 closer to the front of the semi-trailer. When the king pin assemblies 60 are in the reverse position, the longitudinal axes 64 are upwardly inclined in a forward direction at a reverse angle represented by reference numeral 86 with the bottoms of the king pin assemblies 60 closer to the rear of the semi-trailer.

While various means can be used for moving the king pin assemblies 60 between the forward and reverse positions, in the specific construction illustrated, such means includes an adapter 88 located between and fixably mounted to a lower flange 90 on each air spring 80 and the axle member 46. The rear end of the arms 40 are generally U-shaped and have laterally spaced extensions 92. Each adapter 88 is located in the space between the extensions 92 of the respective arm 40 and is mounted on the respective arm 40 by a bolt or pin 94 affixed to the adapter 88 and extending through bearings 96 in the extensions 92. The adapter 88 and the axle member 46 pivot relative to the arm 40 about a second transverse axis defined by the pin 94.

Means are provided for selectively pivoting the adapters 88 and the axle members 46 relative to the arms 40. While various suitable means can be used for this purpose, in the specific construction illustrated, such means includes a generally vertical link 100 having a lower end fixably mounted on the axle member 46, such as by bolts 101 (FIG. 7), and a two-piece horizontal arm 102 extending generally parallel to the horizontal leg 42 of the arm 40. Each arm 102 includes a first segment 104 having an outer end mounted on the upper end of the link 100 for relative pivotal movement about a third transverse axis defined by a bolt or pin 106 and a second segment 108 having an outer end mounted on a side member 52 of the support bracket 54 for relative pivotal movement about a fourth transverse axis defined by a bolt or pin 110. Located in the space between the segments 104 and 108 is an actuator or air-operated cylinder 112 which serves as a shifting means. The cylinder 112 includes a base end which is pivotally connected to the inner end of the second segment 108 at 114 and a reciprocative piston (not shown) carrying a piston rod 116 which is pivotally connected to the inner end of the first segment 104 at 118.

Pressure is selectively supplied to the base end of the cylinder 112 (FIGS. 5 and 8) through a conduit 120 to extend the piston rod 116 and is selectively supplied to the rod end of the cylinder 112 through a conduit 122 to retract the piston rod 116. Extension of the piston rods 116 pivots the axle member 56 and the king pin assemblies 60 relative to the arms 40 (in a clockwise direction as viewed in FIGS. 3, 5 and 6) toward the reverse position. Retraction of the piston rods 116 pivots the axle member 46 and the king pin assemblies 60 relative to the arms 40 (in a counterclockwise direction as viewed in FIGS. 3, 5 and 6) toward the forward position. The forward and reverse angles 84 and 86 are less than 30° to the vertical plane 72 and preferably within the range of about 3 to about 15°.

Means preferably are provided to maintain the longitudinal axes 64 of the king pin assemblies 60 in the desired angle during over-the-road travel when the rear portion of the semi-trailer tends to balance up and down. In the particular construction illustrated, such means includes positioning the pins 50, 94, 106 and 110 relative to each other so that the pivot axes defined thereby generally define a parallelogram when the axes 64 king pin assemblies 60 are in a neutral or vertical position, i.e., coincident with the vertical plane 72. That is, the distance between the centers of pins 94 and 106 and the centers of pins 50 and 110 are substantially equal, as is the distance between the centers of pins 50 and 94 and the centers of pins 106 and 110. With such an arrangement, there is very little, if any, change in the angle of the king pin assemblies 60 in the event the axle member 46 moves up and down relative to the semi-trailer frame members 22.

Operation of the air cylinders 112 is controlled in a suitable manner to provide the desired orientation of the king pin assemblies 60. FIG. 8 schematically illustrates a control system for automatically controlling the operation of the air cylinders 112. For the sake of brevity, only a portion of the system for controlling operation of one air cylinder is illustrated.

The control system 130 includes a source of compressed air 132, such as a tank or engine driven pump, a solenoid-operated, four-way valve 134 connected to the source via a conduit 136 and connected to the air cylinder 112 via conduits 120 and 122. The valve 134 is movable between first and second positions. When in the first position, pressurized air is applied to the base end of the air cylinder 112 via conduits 136 and 120 to extend the piston rod 116 and air is exhausted from the rod end to the atmosphere through the conduit 122 and a port 138 in the valve 134. When in the second position, pressurized air is applied to the rod end of the cylinder 112 via conduits 136 and 122 to retract the piston rod 116 and air is exhausted from the rod end to the atmosphere via the conduit 120 and the port 138. The valve 134 is biased toward the first position and is moved to the second position in response to energization of its solenoid 140.

The control system 130 has an electrical control circuit including a selector switch 144 connected to a source of electrical power 146, such as the tractor battery or alternator. The selector switch 144 is movable between an open or forward position illustrated by the solid lines in FIG. 8 and a closed or reverse position illustrated by the dashed lines in FIG. 8.

When the selector switch 144 i in the forward position, the valve 134 is in the first position and the air cylinder piston hood 116 is extended to move the king pin assemblies 60 to the forward position. When the selector switch 144 is moved to the reverse position, a relay R1 is energized to close the normally open contacts 150 and the valve solenoid 140 is energized to move the valve 134 to the second position. When this occurs, the air cylinder piston rod 116 is retracted to move the kingpin assemblies 60 to the reverse position. If the self-steering axle wheels 30 are lowered into engagement with the ground at this time, the axle member 46 may not actually pivot from the forward position to the reverse position until initial backing of the semi-trailer 20.

Means are provided for moving the selector switch 144 between the forward and reverse positions. While various suitable means can be used for this purpose, the specific construction schematically illustrated by solid lines in FIG. 8, the selector switch 144 is operably connected to the shifting mechanism of the tractor transmission 152 in a suitable manner, either electrically or mechanically, such that the selector switch 144 is moved to the forward position in response to the transmission being shifted to a forward drive position and is moved to the reverse position in response to the transmission being shifted into reverse.

In the embodiment schematically illustrated by dashed lines in FIG. 8, the relay R1 is interconnected in the truck lighting system 154 so that it is energized in response to electrical power being supplied to the truck backup lights 156 and is de-energized when the transmission is shifted out of reverse.

In this embodiment, the relay contacts 150 act as a selector switch with their normally open position being the forward position and their closed position being the reverse position. The selector switch 144 can be deleted, in which case the terminals for the relay coil and the contacts 150 are connected to the power supply by separate wires.

To maintain stability during over-the-road travel, load adjusting means are provided for maintaining a balance between the loads borne by the self-steering axle assembly and the stationary axle assembly. While various suitable means can be used for this purpose, in the specific construction illustrated, such load adjusting means is arranged t control the pressure applied to the stationary axle air springs 38 and the self-steering axle air springs 80 so that the pressure applied to the self-steering axle air springs 80 does not exceed that applied to the stationary axle air springs 38.

Referring to FIG. 9, the stationary axle air springs 38 an the self-steering axle air springs 80 are connected to the compressed air source 132 via conduits 160, 162 and 164. Common pressure to the air springs 38 and 80 is controlled by a valve 166 in the conduit 160. pressure to the stationary axle air springs 38 is controlled by a normally open, solenoid-operated valve 168 in the conduit 162 and pressure to the self-steering axle air springs 80 is controlled by a normally opened, solenoid-operated valve 170 in the conduit 164.

If the pressure in the self-steering axle air springs 80 becomes greater than that in the stationary axle air springs 38, a substantial portion of the load could be shifted to the self-steering axle assembly, in which event the self-steering axle wheels 30 could cause the semi-trailer 22 to weave back and forth.

The relative pressure in the air springs is sensed by a pressure switch 172 connected in fluid communication with the air springs 38 and 80 via sensing lines 174 and 176, respectively. The pressure switch 172 is electrically connected to the valve 170 through a suitable control 178 which is operable to open and close the valve 170 in response to movement of the pressure switch 172. When the pressure in the air springs 38 and 80 is equal and the loads borne by the stationary axle assembly 24 and the self-steering axle assembly 28 are substantially equal, the valve 170 remains open. In the event the pressure in the self-steering axle air springs 00 exceeds that in the stationary air springs 38, the pressure switch 172 actuates and the electrical control 178 causes the valve 170 to close and vent pressure from the air springs 80. When the pressure switch 172 senses that the pressure in the self-steering axle air springs 80 is equal to or less than that in the stationary axle air springs 38, the electrical control 178 causes the valve 170 to open.

Referring back to FIG. 1, in a preferred embodiment, the semi-truck unit is rated for 80,000 pounds gross weight and still has only four axles. All of the axles, including the front axle of the tractor 12, have a gross load rating of at least 20,000 pounds. The distance between the centers of the tractor front axle and the single drive axle, i.e., the distance B, is at least 10 feet. As mentioned above, the distance between the centers of the stationary axle and the self-steering axle, i.e., the distance A, is at least 10 feet. The distance between the centers of the tractor drive axle and the self-steering axle, i.e., the distance C, is the minimum required by present government regulations, for example, 32 feet. The distance between the centers of the tractor front axle and the self-steering axle, i.e., the distance D, is the minimum required by present government regulations, for example, 57 feet.

From the above description, it can be appreciated that the use of a self-steering rear axle on a semi-trailer in accordance with the invention provides several advantages. For example, the turning radius for longer semi-trailers can be reduced as much as three feet or more. The tires on the stationary axle act as a pivot during turning and the heels on the self-steering axle track behind, thereby minimizing tire scuffing on both axles and substantially reducing side torque on the semi-trailer frame. Reduction of this torque and a reduction in the bridge or span between the fifth wheel and the stationary axle, by virtue of being located at least 10 feet in front the self-steering axle, permits the use of lighter frame members. A lighter frame means an increase in gas mileage and a reduction in tire wear.

By making the self-steering axle retractable, a further savings from less tire wear and better gas mileage can be realized when lighter loads are being hauled or the semi-trailer is empty.

By providing the tractor with a front axle having a gross load rating of at least 20,000 pounds and a single drive axle located at least 10 feet behind the front axle, an entire drive axle weighing up to 2,500 pounds can be eliminated, resulting in a reduction of manufacturing costs and gross weight. Also, a smaller engine can be used and still deliver the same horse power to the ground, resulting in still further savings from less tire wear and better gas mileage.

From the foregoing description, one skilled in the art can easily ascertain the essential characteristics of the invention and, without departing from the spirit and scope thereof, make various changes and modifications to adapt it to various usages. For example, a hydraulic actuation system or an electric motor driven system can be used to pivot the self-steering axle member between the forward and reverse positions, the king pin assemblies can be pivotally mounted on the axle member and the actuation means connected directly to the king pin assemblies to pivot them relative to the axle member.

I claim:

1. A semi-trailer for a truck-tractor including a front axle, said semi-trailer comprising
   a frame supported for over-the-road travel by independent first and second axle assemblies respectively including first and second transverse axle members having opposite outer end portions, each of said outer end portions carrying a road engaging wheel;
   said first axle member being stationary and spaced at least ten feet in front of said second axle member;
   said second axle member being spaced rearwardly from the truck-tractor front axle at least the minimum distance required by government regulations;
   means interconnecting said wheels of said second axle assembly so they steer together; and
   means independent of said first axle assembly for causing said wheels on said second axle assembly to track the wheels of said first axle assembly during turning of said semi-trailer in both the forward and reverse directions.

2. A semi-trailer according to claim 1 including load adjusting means for adjusting the load borne by said first and second axle assemblies and for maintaining a balance therebetween so that the load borne by said second axle assembly does not exceed the load borne by said first axle assembly.

3. A semi-trailer according to claim 2 wherein said load adjusting means includes
   a first pair of air inflatable air springs disposed between said trailer frame and said first axle member;
   a second pair of inflatable air springs disposed between said trailer frame and said second axle member; and
   means for pressurizing said first and second pairs or air springs including a control for preventing the pressure delivered to sad second pair of air springs from exceeding the pressure delivered to said first pair of air springs.

4. A semi-trailer according to claim 1 including
   means mounting said second axle assembly on said frame for pivotal movement of said second axle member between an operating position wherein said wheels thereof are in engagement with the ground and a retracted position wherein said wheels are raised above the ground; and
   means for selectively moving said second axle member between the operating and retracted positions.

5. A semi-trailer according to claim 1 including
   a king pin assembly having a longitudinal axis mounted on each of said outer end portions of said second axle member and carrying a said wheel for rotation about a transverse rotational axis and for steering movement;
   means interconnecting said king pin assemblies so said wheels steer together;
   pivot means on said second axle member for permitting pivotal movement of said king pin assemblies relative to said trailer frame between a forward position wherein the longitudinal axis of said king pin assemblies are upwardly inclined in a rearward direction at a forward angle and a reverse position wherein the longitudinal axes of said king pin assemblies are upwardly inclined in a forward direction at a reverse angle, said forward and reverse angles being less than about 30° to a vertical plane passing through the rotational axes of said wheels; and
   means for selectively moving said kingpin assemblies between the forward and reverse positions.

6. A semi-trailer according to claim 5 wherein
   said pivot means includes means supporting said second axle member from said trailer frame for pivotal movement of said second axle member relative to said trailer frame about a transverse axis; and
   said means for moving said kingpin assemblies between the forward and reverse positions includes
   actuation means supported from said trailer frame and operably connected to said second axle member for pivoting said second axle member relative to said trailer frame in opposite directions, and
   motive means for moving said actuation means in a first direction to pivot said second axle member in one direction and to move said king pin assemblies to the forward position and for moving said actuation means in a second direction to pivot said second axle member in the opposite direction and move said king pin assemblies to the reverse position.

7. A semi-trailer according to claim 6 wherein said motive means includes
   control means having an electrical circuit interconnecting said motive means to a source of electrical power and a selector switch connected in said electrical circuit and selectively movable between a forward position wherein said motive means moves said actuation means in the first direction and a reverse position wherein said motive means moves said actuation means in the second direction.

8. A semi-trailer according to claim 6 wherein said second axle member mounting means includes a pair of laterally spaced first arms mounted for pivotal movement about a first transverse pivot axis relative to said trailer frame, each of said arms including a vertical leg and a generally longitudinally extending leg having an outer end portion carrying said second axle member for relative pivotal movement about a second transverse pivot axis;

means for selectively moving said first arms between the operating and retracted position; and stabilizing means for substantially maintaining the longitudinal axes of said king pin assemblies at said predetermined angle in the event of relative movement of said second axle member and said trailer frame during over-the-road travel.

9. A semi-trailer according to claim 8 wherein said actuation means and said stabilizing means comprises a two-piece generally horizontally extending second arm including a first segment having a first inner end and an outer end mounted on said second axle member for relative pivotal movement about a third transverse pivot axis vertically spaced from said first pivot axis and a second segment having a second inner end spaced from said first inner end and an outer end mounted on said vertical leg of said first arm for relative pivotal movement about a fourth transverse pivot axis vertically spaced from said second pivot axis in the same direction as said third pivot axis is spaced from said first pivot axis, said first, second, third and fourth pivot axes generally defining a parallelogram; and shifting means operably connected between said first and second inner ends of said segments for selectively moving said first and second inner ends toward and away from each other.

10. A semi-trailer according to claim 9 wherein said shifting means comprises a fluid-actuated cylinder connected to one of said first and second inner ends of said segments and having a reciprocating piston operably connected to other of said first and second inners end;

said motive means includes a source of pressurized fluid and valve means for selectively controlling the flow of pressurized fluid from said source to the opposite sides of said piston; and said control means is operably connected to said valve means so that movement of said switch to the forward position causes movement of said piston in a first direction to rotate said second axle member in the first direction and movement of said switch to the reverse position causes movement of said piston in the second direction to rotate said second axle member in the second direction.

11. A semi-trailer truck unit including a tractor having a chassis supported for over-the-road travel by a front steering axle assembly carrying ground engaging wheels, a single drive axle assembly carrying ground engaging wheels and spaced at least ten feet rearwardly from said front axle, and a trailer swivel mount supported on the rear portion of said chassis;

a semi-trailer including a frame carrying mounting means for removable and pivotal connection with said tractor swivel mount and supported for over-the-road travel by independent first and second axle assemblies respectively including first and second transverse axle members having opposite outer end portions, each of said outer and portions carrying road engaging wheels;

said first axle member being stationary and spaced at least the feet in front of said second axle member;

said second axle member being at a location corresponding to at least the minimum distance between the tractor front axle and a rearmost axle of a semi-trailer required by government regulations;

means interconnecting said wheels of said second axle assembly so they steer together;

means independent of said first axle assembly for causing the wheels of said second axle assembly to track the wheels of said first axle assembly during turning of said semi-trailer in both the forward and reverse directions; and said unit having a gross load rating and each of said front axle assembly, drive axle assembly, first axle assembly, sand second axle assembly having a load rating of at least one-fourth of the unit gross load rating.

12. A semi-trailer truck unit according to claim 10 including load adjusting means for adjusting the load borne by said first and second axle assemblies and for maintaining the balance therebetween so that the load borne by said second axle assembly does not exceed the load borne by said first axle assembly.

* * * * *